(12) United States Patent
Haruna et al.

(10) Patent No.: US 7,018,570 B2
(45) Date of Patent: Mar. 28, 2006

(54) ULTRAVIOLET ABSORBER COMPOSITION AND RESIN COMPOSITION STABILIZED THEREWITH

(75) Inventors: Tohru Haruna, Saitama (JP); Shinichi Ishikawa, Saitama (JP)

(73) Assignee: Asahi Denka Kogyo K.K., Tokyo (JP)

( * ) Notice: Subject to any disclaimer, the term of this patent is extended or adjusted under 35 U.S.C. 154(b) by 52 days.

(21) Appl. No.: 10/479,641

(22) PCT Filed: Jun. 6, 2002

(86) PCT No.: PCT/JP02/05597

§ 371 (c)(1),
(2), (4) Date: Feb. 12, 2004

(87) PCT Pub. No.: WO02/100970

PCT Pub. Date: Dec. 19, 2002

(65) Prior Publication Data

US 2004/0122137 A1    Jun. 24, 2004

(30) Foreign Application Priority Data

Jun. 7, 2001 (JP) .............................. 2001-172080

(51) Int. Cl.
*C09K 15/16* (2006.01)
*C07D 249/16* (2006.01)
*C07D 403/00* (2006.01)

(52) U.S. Cl. ...................... 252/589; 252/588; 252/405; 548/257; 430/931

(58) Field of Classification Search ................ 252/588, 252/589; 450/512; 514/972
See application file for complete search history.

(56) References Cited

U.S. PATENT DOCUMENTS

| | | | | |
|---|---|---|---|---|
| 4,127,586 A | * | 11/1978 | Rody et al. | 524/91 |
| 4,681,905 A | * | 7/1987 | Kubota et al. | 548/260 |
| 5,077,328 A | * | 12/1991 | Haruna et al. | 524/100 |
| 5,112,891 A | * | 5/1992 | Haruna et al. | 524/101 |
| 5,229,521 A | * | 7/1993 | Luisoli et al. | 548/260 |
| 6,166,218 A | * | 12/2000 | Ravichandran et al. | 548/260 |

FOREIGN PATENT DOCUMENTS

| | | | |
|---|---|---|---|
| JP | 61-113649 | | 5/1986 |
| JP | 61-113667 | | 5/1986 |
| JP | 61-118373 | | 6/1986 |
| JP | 61-163954 | | 7/1986 |
| JP | 62-146951 | | 6/1987 |
| JP | 62-172058 | | 7/1987 |
| JP | 62-225554 | | 10/1987 |
| JP | 62225554 A | * | 10/1987 |
| JP | 63-010653 | | 1/1988 |
| JP | 01-170631 | | 7/1989 |
| JP | 2000-191918 | * | 7/2000 |
| JP | 2001-72839 | | 3/2001 |
| JP | 2001072839 | * | 3/2001 |
| JP | 2001-115002 | | 4/2001 |
| JP | 2001115002 | * | 4/2001 |

* cited by examiner

*Primary Examiner*—Randy Gulakowski
*Assistant Examiner*—Timothy J. Kugel
(74) *Attorney, Agent, or Firm*—Nixon & Vanderhye, PC

(57) ABSTRACT

The present invention is directed to an ultraviolet absorber composition which is formed by melt-mixing a compound (A) represented by formula (I):

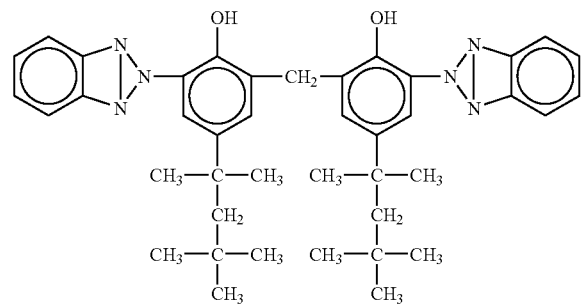

(I)

and a resin stabilizer (B) selected from the group consisting of a phenolic antioxidant (b-1), a phosphorus-containing antioxidant (b-2), a hindered amine stabilizer (b-3), and an ultraviolet absorber (b-4) other than the compound (A), at a mass ratio (A)/(B) of 95/5 to 50/50. The composition has excellent compatibility with synthetic resins and provides a stabilized synthetic resin molding.

16 Claims, No Drawings

ULTRAVIOLET ABSORBER COMPOSITION AND RESIN COMPOSITION STABILIZED THEREWITH

This application is the US national phase of international application PCT/JP02/05597 filed 6 Jun. 2002 which desinated the U.S., the entire content of which is hereby incorporated by reference in this application.

TECHNICAL FIELD

The present invention relates to an ultraviolet absorber composition which is produced by melt-mixing a benzotriazole compound having a specific structure and a resin stabilizer other than the benzotriazole compound and which has a low melting temperature and excellent compatibility with a resin. The invention also relates to a synthetic resin composition stabilized by the ultraviolet absorber composition.

BACKGROUND ART

Conventionally, a variety of synthetic resins have been applied, according to their chemical and physical characteristics, to uses such as building materials, agricultural materials, miscellaneous goods, automobile parts, housings of electric appliances, coatings, and packaging materials.

Without resin stabilizers, most synthetic resins are deteriorated by heat or light. Therefore, an antioxidant such as a phenolic antioxidant, a phosphorus antioxidant, or a sulfur antioxidant; an ultraviolet absorber; or a hindered amine stabilizer has been added to the synthetic resins.

Conventionally, in order to stabilize a resin, a plurality of additives have also been added to the resin depending on the purpose of stabilization. Combination of such additives has been widely known to produce synergistic effects. For example, a combination of a phenolic antioxidant and a phosphorus antioxidant imparts heat resistance to the resin, and a combination of an ultraviolet absorber and a hindered amine stabilizer imparts weather resistance to the resin.

Among these additives, 2,2'-methylenebis(4-tert-octyl-6-benzotriazolyl)phenol is known to serve as an excellent ultraviolet absorber, as disclosed in Japanese Patent Application Laid-Open (kokai) No. 61-118373. Japanese Patent Application Laid-Open (kokai) Nos. 61-113649, 61-113667, 61-163954, 62-225554, 62-146951, 62-172058, 63-10653, etc. disclose uses of the phenol compound in a variety of resins.

However, 2,2'-methylenebis(4-tert-octyl-6-benzotriazolyl)phenol has poor compatibility with certain types of resin, such as polyolefin resin. When the compound is added to such a resin, the compound migrates to the surface of the resin products (i.e., exhibits blooming), thereby impairing the commercial value of the resin products. Therefore, limitations have been imposed on the type of resin to which the compound is added.

Thus, demand has arisen for improving the compatibility of 2,2'-methylenebis(4-tert-octyl-6-benzotriazolyl)phenol—an excellent ultraviolet absorber—to a resin, thereby enabling addition of the compound to a resin for which highly stabilizing effect is required.

DISCLOSURE OF THE INVENTION

The present inventors have carried out extensive studies in an attempt to meet the aforementioned demand, and have found that an ultraviolet absorber composition produced by melt-mixing 2,2'-methylenebis(4-tert-octyl-6-benzotriazolyl)phenol and a resin additive other than the phenol compound has excellent compatibility with a resin, and that a stabilized resin composition which provides products with less blooming can be produced from the ultraviolet absorber composition. The present invention has been accomplished on the basis of these findings.

Accordingly, in a first mode of the present invention, there is provided an ultraviolet absorber composition which is formed by melt-mixing a compound (A) represented by the following formula (I):

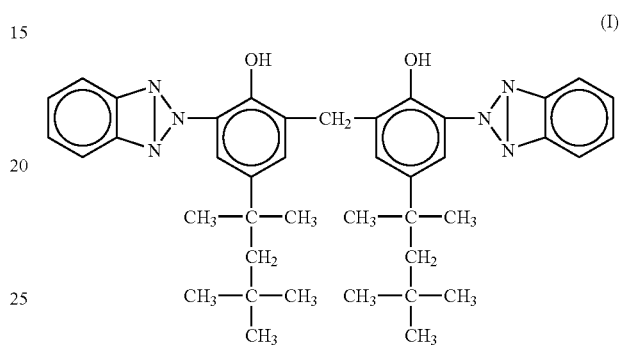

and a resin stabilizer (B) selected from the group consisting of a phenolic antioxidant (b-1), a phosphorus-containing antioxidant (b-2), a hindered amine stabilizer (b-3), and an ultraviolet absorber (b-4) other than the compound (A), at a mass ratio (A)/(B) of 95/5 to 50/50.

A second mode of the present invention is drawn to a specific ultraviolet absorber composition of the first mode, wherein the resin stabilizer (B) is the ultraviolet absorber (b-4) other than the compound (A).

A third mode of the present invention is drawn to a specific ultraviolet absorber composition of the second mode, wherein the ultraviolet absorber (b-4) other than the compound (A) is a benzotriazole ultraviolet absorber.

A fourth mode of the present invention is drawn to a specific ultraviolet absorber composition of the third mode, wherein the benzotriazole ultraviolet absorber is a compound represented by the following formula (II).

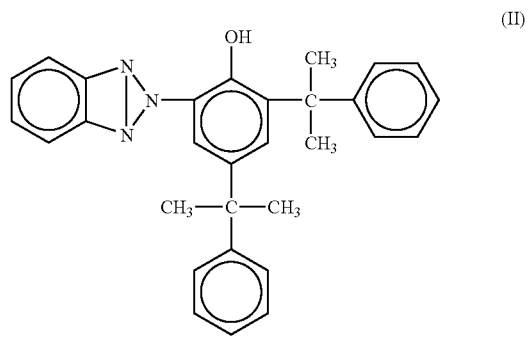

In a fifth mode of the present invention, there is provided a synthetic resin composition comprising a synthetic resin and an ultraviolet absorber composition as recited in relation to any of the first to fourth modes.

A sixth mode of the present invention is drawn to a specific synthetic resin composition of the fifth mode, wherein the synthetic resin is a polyolefin resin.

BEST MODE FOR CARRYING OUT THE INVENTION

Modes for carrying out the present invention will next be described.

Examples of the phenolic antioxidant (b-1) used in the present invention include 2,6-di-tert-butyl-p-cresol, 2,6-diphenyl-4-octadecyloxyphenol, distearyl (3,5-di-tert-butyl-4-hydroxybenzyl) phosphonate, 1,6-hexamethylenebis[(3,5-di-tert-butyl-4-hydroxyphenyl)propionamide], 4,4'-thiobis(6-tert-butyl-m-cresol), 2,2'-methylenebis(4-methyl-6-tert-butylphenol), 2,2'-methylenebis(4-ethyl-6-tert-butylphenol), 4,4'-butylidenebis(6-tert-butyl-m-cresol), 2,2'-ethylidenebis(4,6-di-tert-butylphenol), 2,2'-ethylidenebis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl) isocyanurate, 1,3,5-tris(3,5-di-tert-butyl-4-hydroxybenzyl) isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl)phenol, stearyl (3,5-di-tert-butyl-4-hydroxyphenyl)propionate, thiodietylene glycol bis[(3,5-di-tert-butyl-4-hydroxyphenyl)propionate], 1,6-hexamethylene bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, tetrakis[methylene-3-(3,5-di-tert-butyl-4-hydroxyphenyl)propionato]methane, 3,9-bis[1,1-dimethyl-2-{(3-tert-butyl-4-hydroxy-5-methylphenyl)propionyloxy}ethyl]-2,4,8,10-tetraoxaspiro[5.5]undecane, and triethylene glycol bis[(3-tert-butyl-4-hydroxy-5-methylphenyl)propionate].

Examples of the phosphorus antioxidant (b-2) used in the present invention include trisnonylphenyl phosphite, tris(2,4-di-tert-butylphenyl) phosphite, tris[2-tert-butyl-4-(3-tert-butyl-4-hydroxy-5-methylphenylthio)-5-methylphenyl] phosphite, tridecyl phosphite, octyl diphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis(2,4,6-tri-tert-butylphenyl)pentaerythritol diphosphite, bis(2,4-dicumylphenyl)pentaerythritol diphosphite, tetra(tridecyl)isopropylidenediphenol diphosphite, tetra(tridecyl)-4,4'-n-butylidenebis(2-tert-butyl-5-metylphenol) diphosphite, hexa(tridecyl)-1,1,3-tris(2-methyl-4-hydroxy-5-tert-butylphenyl)butane triphosphite, tetrakis(2,4-di-tert-butylphenyl)biphenylene diphosphonite, 9,10-dihydro-9-oxa-10-phosphaphenanthrene-10-oxide, 2,2'-methylenebis(4,6-tert-butylphenyl)-2-ethylhexyl phosphite, 2,2'-methylenebis(4,6-tert-butylphenyl)-octadecyl phosphite, 2,2'-ethylidenebis(4,6-di-tert-butylphenyl)fluorophosphite, tris(2-[(2,4,8,10-tetrakis-tert-butyldibenzo[d,f][1,3,2]dioxaphosphepin-6-yl)oxy]ethyl)amine, and a phosphite of 2-ethyl-2-butylpropylene glycol and 2,4,6-tri-tert-butylphenol.

Examples of the hindered amine stabilizer (b-3) used in the present invention include hindered amine compounds such as 2,2,6,6-tetramethyl-4-piperidyl stearate, 1,2,2,6,6-pentamethyl-4-piperidyl stearate, 2,2,6,6-tetramethyl-4-piperidyl benzoate, bis(2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butanetetracarboxylate, tetrakis(1,2,2,6,6-pentamethyl-4-piperidyl)butanetetracarboxylate, bis(2,2,6,6-tetramethyl-4-piperidyl) di(tridecyl) 1,2,3,4-butanetetracarboxylate, bis(1,2,2,6,6-pentamethyl-4-piperidyl) di(tridecyl) 1,2,3,4-butanetetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate condensate, 1,6-bis(2,2,6,6-tetramethyl-4-piperidylamino)hexane/dibromoethane condensate, 1,6-bis(2,2,6,6-tetramethyl-4-piperidylamino)hexane/2,4-dichloro-6-morpholino-s-triazine condensate, 1,6-bis(2,2,6,6-tetramethyl-4-piperidylamino)hexane/2,4-dichloro-6-tert-octylamino-s-triazine condensate, 1,5,8,12-tetrakis[2,4-bis(N-butyl-N-(2,2,6,6-tetramethyl-4-piperidyl)amino)-s-triazin-6-yl]-1,5,8,12-tetrazadodecane, 1,5,8,12-tetrakis[2,4-bis(N-butyl-N-(1,2,2,6,6-pentamethyl-4-piperidyl)amino)-s-triazin-6-yl]-1,5,8,12-tetrazadodecane, 1,6,11-tris[2,4-bis(N-butyl-N-(2,2,6,6-tetramethyl-4-piperidyl)amino)-s-triazin-6-yl]aminoundecane, and 1,6,11-tris[2,4-bis(N-butyl-N-(1,2,2,6,6-pentamethyl-4-piperidyl)amino)-s-triazin-6-yl]aminoundecane.

Examples of the ultraviolet absorber (b-4) other than the compound (A) used in the present invention include 2-hydroxybenzophenone compounds such as 2,4-dihydroxybenzophenone, 2-hydroxy-4-methoxybenzophenone, 2-hydroxy-4-octoxybenzophenone, and 5,5'-methylenebis(2-hydroxy-4-methoxybenzophenone); 2-(2'-hydroxyphenyl)benzotriazole compounds such as 2-(2'-hydroxy-5'-methylphenyl)benzotriazole, 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, and 2-(2'-hydroxy-3'-tert-butyl-5'-carboxyphenyl)benzotriazole; benzoates such as phenyl salicylate, resorcinol monobenzoate, 2,4-di-tert-butylphenyl-3,5-di-tert-butyl-4-hydroxybenzoate, 2,4-di-tert-amylphenyl-3,5-di-tert-butyl-4-hydroxybenzoate; and hexadecyl-3,5-di-tert-butyl-4-hydroxybenzoate; substituted oxanilide compounds such as 2-ethyl-2'-ethoxyoxanilide and 2-ethoxy-4'-dodecyloxanilide; cyanoacrylates such as ethyl-α-cyano-β,β-diphenylacrylate and methyl-2-cyano-3-methyl-3-(p-methoxyphenyl)acrylate; and triaryltriazines such as 2-(2-hydroxy-4-octoxyphenyl)-4,6-bis(2,4-di-tert-butylphenyl)-s-triazine, 2-(2-hydroxy-4-methoxyphenyl)-4,6-diphenyl-s-triazine, and 2-(2-hydroxy-4-propoxy-5-methylphenyl)-4,6-bis(2,4-di-tert-butylphenyl)-s-triazine.

The resin stabilizer (B) is added to a resin in a preferred amount, which varies in accordance with the type and use purpose of the resin and depending on the type of the resin stabilizer (i.e., antioxidant, hindered amine compound, or ultraviolet absorber). Thus, among resin stabilizers (B), the ultraviolet absorber (b-4) other than the compound (A) is preferably used, since the amount of the absorber (b-4) incorporated into the ultraviolet absorber composition to be added to a resin can be selected from a wide range. Among ultraviolet absorbers (b-4), a benzotriazole ultraviolet absorber, having high compatibility with the compound (A) during melt-mixing, is more preferred, with a compound represented by the following formula (II) being particularly preferred, from the viewpoint of a remarkable blooming-prevention effect.

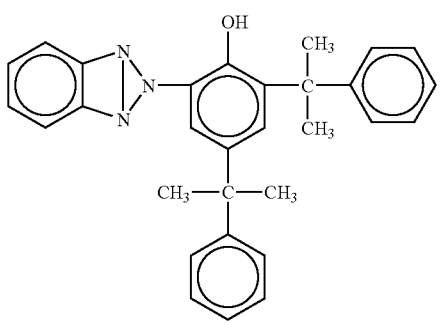

(II)

In order to ensure both benefits of excellent ultraviolet absorbing performance of the compound (A) and the effects—provided through melt-mixing, of lowering the melting temperature of the ultraviolet absorber composition and preventing blooming—the ratio of compound (A) to resin stabilizer (B) ((A)/(B)) by mass is controlled so as to fall within a range of 95/5 to 50/50, preferably 90/10 to 70/30.

Examples of synthetic resins to which the ultraviolet absorber composition of the present invention include homopolymers and copolymer of α-olein such as polypropylene, low-density polyethylene, linear-low-density polyethylene, high-density polyethylene, polybutene-1, poly(3-methylpentene), poly(4-methylpentene), and ethylene-polyethylene copolymer; copolymers of α-olefins with a polyunsaturated compound such as conjugated or non-conjugated diene, acrylic acid, methacrylic acid, or vinyl acetate; linear polyesters and acid-modified polyesters such as polyethylene terephthalate, polyethylene terephthalate isophthalate, polyethylene terephthalate p-oxybenzoate, and polybutylen terephthalate; polyamides such as polycaprolactam and polyhexamethyleneadipamide; polyimides; polystyrene; copolymers (e.g., AS resin, ABS resin, MBS resin, and heat-resistant ABS resin) of styrene and/or α-methylstyrene with a monomer (e.g., maleic anhydride, phenylmaleimide, methyl methacrylate, butadiene, or acrylonitrile); halogen-containing resins such as polyvinyl chloride, polyvinylidene chloride, chlorinated polyethylene, chlorinated polypropylene, polyvinylidene fluoride, chlorinated rubber, vinyl chloride-vinyl acetate copolymer, vinyl chloride-ethylene copolymer, vinyl chloride-vinylidene chloride copolymer, vinyl chloride-vinylidene chloride-vinyl acetate terpolymer, vinyl chloride-acrylic ester copolymer, vinyl chloride-maleic ester copolymer, and vinyl chloride-cyclohexylmaleimide copolymer; polymers of (meth)acrylic ester such as methyl (meth)acrylate, ethyl (meth)acrylate, or octyl (meth)acrylate; thermoplastic resins such as polyether ketone, polyvinyl acetate, polyvinyl formal, polyvinyl butyral, polyvinyl alcohol, linear or branched polycarbonate, petroleum resins, cumarone resins, polyphenylene oxide, polyphenylene sulfide, polyurethane, and cellulose resin; thermosetting resins such as epoxy resin, phenolic resin, urea resin, melamine resin, and unsaturated polyester resin; elastomers such as polyisoprene rubber, polybutadiene rubber, butadiene-styrene copolymer rubber, butadiene-acrylonitrile copolymer rubber, acrylonitrile-butadiene-styrene copolymer ethylene-α-olefin (e.g., propylene or butene-1) copolymer rubber, and ethylene-α-olefin-non-conjugated diene (e.g., ethylidenenorbornene or cyclopentadiene) terpolymer rubber; and silicone resins. Polymer alloys and blends of these resins and/or elastomers may also used. Particularly, the ultraviolet absorber composition of the present invention is suitably added to polyolefin resin, which per se has poor compatibility with 2,2'-methylenebis(4-tert-octyl-6-benzotriazolyl)phenol.

To the synthetic resin composition of the present invention, other additives which are generally used in resins may be added in accordance with needs. Examples of the additives include thioether antioxidants; nucleating agents such as a phosphate ester metal salt, benzylidene sorbitol, and a benzoic acid derivative metal salt; heavy metal deactivators; fatty acid metal salts; hydrotalcite; fillers; pigments; dyes; fire-proofing agents; and processing aids.

No particular limitation is imposed on the method for producing the ultraviolet absorber composition of the present invention. For example, the composition can be produced by heat-melting the compound (A) and the resin stabilizer (B) in a vessel in an inert atmosphere; transferring the melt under stirring to an aluminum tray for cooling; and pulverizing the cooled mixture by means of a flaker. Alternatively, the composition can be produced by dissolving the compound (A) and the resin stabilizer (B) in a solvent to form a uniform solution; removing the solvent from the solution at a temperature equal to or exceeding the melting temperature of the mixture to be produced through removal of the solvent, to thereby form a melt mixture; and removing, cooling, and crushing the mixture. The latter method, in which two components are dissolved in a solvent to form a solution, requires an additional solvent removal step and is not advantageous from an economical viewpoint. However, the process can be performed at a comparatively low temperature, whereby coloring and decomposition of the compound (A) and the resin stabilizer (B) by heat can be prevented.

No particular limitation is imposed on the method for incorporating the thus-produced ultraviolet absorber composition into a synthetic resin, and a method known per se for incorporating a stabilizer to a resin; e.g., mixing by means of a ribbon blender, a Henschel mixer, etc., can be employed. An extruder or a Banbury mixer may also be used in accordance with needs. Although the amount of the ultraviolet absorber composition incorporated into a synthetic resin varies in accordance with the mass ratio (A)/(B) of the ultraviolet absorber composition, each component is used in an amount of 0.001 to 10 parts by mass based on 100 parts by mass of the synthetic resin, preferably 0.05 to 5 parts by mass.

EXAMPLES

The present invention will next be described in more detail by way of examples, which should not be construed as limiting the invention thereto.

Examples 1-1 to 1-7

Each sample compound (listed in Table 1) (5 g) and 2,2'-methylenebis(4-tert-octyl-6-benzotriazolyl)phenol (20 g) were mixed for 30 seconds by means of a mixer, and the mixture was dissolved at 180° C. in an aromatic hydrocarbon solvent (SOLVESSO® 150 solvent, product of ExxonMobil Chemical Company) (25 g). The solvent of the solution was removed while the solution was maintained at 180° C., to thereby form a melt mixture. The thus-formed melt mixture was transferred to an aluminum tray and cooled, and pulverized to a particle size of 1 mm or less. The melting temperature of the pulverized product was determined through visual observation. The results are shown in Table 1.

Comparative Examples 1-1 to 1-4

Each sample compound (listed in Table 1) (5 g) and 2,2'-methylenebis(4-tert-octyl-6-benzotriazolyl)phenol (20 g) were mixed for 30 seconds by means of a mixer, to thereby yield a "physically prepared mixture." The melting temperature of the mixture was determined through visual observation. The results are shown in Table 1. Notably, in Comparative Examples, temperatures shown in the column labeled "Melting temperature of melt mixture" of Table 1 represent the melting temperatures of the two components of the physically prepared mixture.

TABLE 1

| | Sample compound | Melting point of sample compound | Melting temp. of melt mixture |
|---|---|---|---|
| Examples | | | |
| 1-1 | Phenol-1*[1] | 50° C. | 55–65° C. |
| 1-2 | Phenol-2*[2] | 115° C. | 65–74° C. |
| 1-3 | Phosphorus-1*[3] | 183° C. | 62–70° C. |
| 1-4 | Phosphorus-2*[4] | 148° C. | 64–71° C. |
| 1-5 | Phosphorus-3*[5] | 237° C. | 72–78° C. |
| 1-6 | HALS-1*[6] | 84° C. | 60–71° C. |
| 1-7 | HALS-2*[7] | >65° C. | 63–71° C. |
| 1-8 | UVA-1*[8] | 135–143° C. | 66–73° C. |
| 1-9 | UVA-2*[9] | 102–105° C. | 67–74° C. |
| Comp. Examples | | | |
| 1-1 | Phenol-1*[1] | 50° C. | 50° C., 193° C. |
| 1-2 | Phosphorus-1*[3] | 183° C. | 182° C., 195° C. |
| 1-3 | HALS-1*[6] | 84° C. | 83° C., 194° C. |
| 1-4 | UVA-1*[8] | 135–143° C. | 133–142° C., 194° C. |

*[1]stearyl (3,5-di-tert-butyl-4-hydroxyphenyl)propionate
*[2]tetrakis[methylene-3-(3,5-di-tert-butyl-4-hydroxyphenyl)propionato]methane
*[3]tris(2,4-di-tert-butylphenyl) phosphite
*[4]2,2'-methylenebis(4,6-tert-butylphenyl)-2-ethylhexyl phosphite
*[5]bis(2,6-di-tert-butyl-4-methylphenyl)pentaerythritol diphosphite
*[6]bis(2,2,6,6-tetramethyl-4-piperidyl) sebacate
*[7]tetrakis(1,2,2,6,6-pentamethyl-4-piperidyl) butanetetracarboxylate
*[8]2-(2'-hydroxy-3',5'-dicumylphenyl)benzotriazole
*[9]2-(2'-hydroxy-5'-tert-octylphenyl)benzotriazole As is clear from Table 1, the melting point of 2,2'-methylenebis(4-tert-octyl-6-benzotriazolyl)phenol and that of the added component were maintained when the two components were simply mixed. However, a composition exhibiting a low melting temperature was formed by melt-mixing the two components.

Example 2-1

Random polypropylene (melt flow index (230° C., 2.16 kg): 2.3 g/10 min) (100 parts by mass), tetrakis[methylene-3-(3,5-di-tert-butyl-4-hydroxyphenyl)propionato]methane (0.02 parts by mass), 2,6-di-tert-butyl-4-methylphenol (0.1 parts by mass), and an ultraviolet absorber composition prepared in Example 1-8 (0.8 parts by mass) were mixed, and the mixture was extruded at 250° C., to thereby produce pellets. The pellets were injection-molded at 250° C., to thereby prepare test pieces having a thickness of 1 mm.

Comparative Example 2-1

The procedure of Example 2-1 was repeated, except that the sample compound or the ultraviolet absorber composition shown in Table 2 was used, to thereby prepare test pieces.

The thus-prepared test pieces were allowed to stand at room temperature for three months, and the surface of each test piece was analyzed (initially, and at month 1, month 2, and month 3) by means of a haze meter (HGM-2DP, SUGA TEST INSTRUMENTS), to thereby determine a haze value. Blooming of the test piece was evaluated by the haze value. The results are shown in Table 2.

TABLE 2

| | | Bloom test (haze value) | | | |
|---|---|---|---|---|---|
| | | Initial | Month 1 | Month 2 | Month 3 |
| Example 2-1 | Ex. 1-8 | 43.1 | 43.9 | 44.1 | 44.7 |
| Comp. Exs. | | | | | |
| 2-1 | UVA-1*[8] | 44.7 | 45.8 | 46.0 | 47.7 |
| 2-2 | UVA-3*[10] | 48.2 | 49.9 | 51.4 | 55.8 |
| 2-3 | Comp. Ex. 1-4 | 46.6 | 47.6 | 48.1 | 51.3 |

*[10]2,2'-methylenebis(4-tert-octyl-6-benzotriazolyl)phenol

As is clear from Comp. Ex. 2-1 to 2-3 in Table 2, test pieces containing 2,2'-methylenebis(4-tert-octyl-6-benzotriazolyl)phenol, 2-(2'-hydroxy-3',5'-dicumylphenyl)benzotriazole, or a simple mixture thereof exhibited a considerable level of blooming. Particularly, sole use of 2,2'-methylenebis(4-tert-octyl-6-benzotriazolyl)phenol caused a higher level of blooming. However, blooming was prevented in the test pieces of Example 2-1 containing a composition prepared through melt-mixing.

The precise mechanism explaining why blooming was prevented has remained unknown. However, one considerable mechanism derived from Examples 1-1 to 1-9 is that compositions prepared through melt-mixing show melting behavior different from that of similar compositions prepared through simple mixing, and such a different behavior may be attributable molecular interaction during melt-mixing, which is maintained after the compositions have undergone processing for forming test pieces.

INDUSTRIAL APPLICABILITY

According to the present invention, there can be provided an ultraviolet absorber composition having excellent light resistance and generating less blooming, and a synthetic resin composition having light resistance that is remarkably improved by the ultraviolet absorber composition.

The invention claimed is:
1. An ultraviolet absorber composition having a reduced melt temperature which comprises a melt-mixture of a compound (A) represented by formula (I):

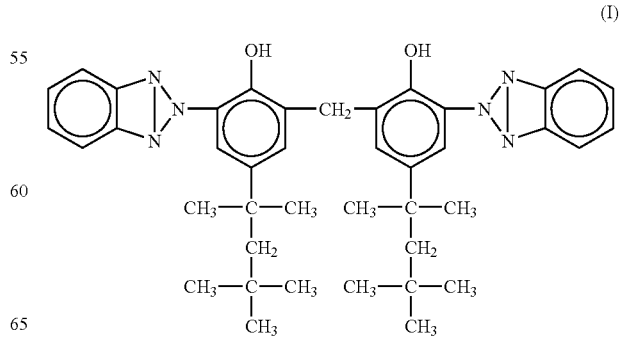

and a resin stabilizer (B), wherein the resin stabilizer (B) is at least one selected from the group consisting of a phenolic antioxidant (b-1), a phosphorus-containing antioxidant (b-2), a hindered amine stabilizer (b-3), and an ultraviolet absorber (b-4) other than the compound (A), and wherein the compound (A) and the resin stabilizer (B) are present in the melt-blend in an amount to provide a mass ratio (A)/(B) of 95/5 to 50/50 sufficient to reduce the melt temperature of the ultraviolet absorber composition.

2. An ultraviolet absorber composition as described in claim 1, wherein the resin stabilizer (B) is the ultraviolet absorber (b-4) other than the compound (A).

3. An ultraviolet absorber composition as described in claim 2, wherein the ultraviolet absorber (b-4) other than the compound (A) is a benzotriazole ultraviolet absorber.

4. An ultraviolet absorber composition as described in claim 3, wherein the benzotriazole ultraviolet absorber is a compound represented by formula (II):

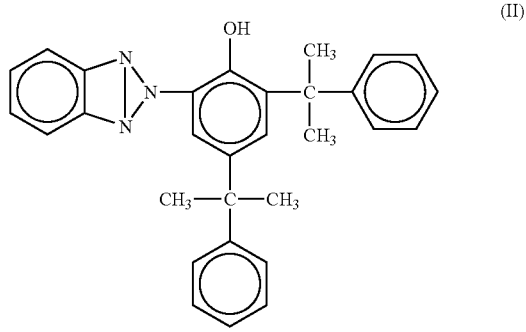

5. A synthetic resin composition comprising a synthetic resin and an ultraviolet absorber composition as recited in claim 4.

6. A synthetic resin composition as described in claim 5, wherein the synthetic resin is a polyolefin resin.

7. A synthetic resin composition comprising a synthetic resin and an ultraviolet absorber composition as recited in claim 3.

8. A synthetic resin composition as described in claim 7, wherein the synthetic resin is a polyolefin resin.

9. A synthetic resin composition comprising a synthetic resin and an ultraviolet absorber composition as recited in claim 2.

10. A synthetic resin composition as described in claim 9, wherein the synthetic resin is a polyolefin resin.

11. A synthetic resin composition comprising a synthetic resin and an ultraviolet absorber composition as recited in claim 1.

12. A synthetic resin composition as described in claim 11, wherein the synthetic resin is a polyolefin resin.

13. A method of making a ultraviolet (UV) light stabilized synthetic resin composition which comprises the steps of:
(1) forming an ultraviolet light absorber composition by melt-mixing a compound (A) represented by formula (I):

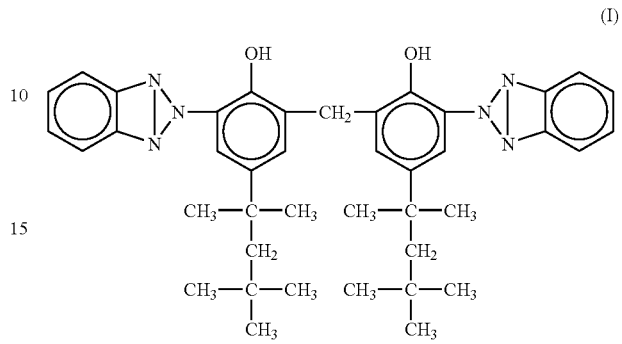

and a resin stabilizer (B), wherein the resin stabilizer (B) is at least one selected from the group consisting of a phenolic antioxidant (b-1), a phosphorus-containing antioxidant (b-2), a hindered amine stabilizer (b-3), and an ultraviolet absorber (b-4) other than the compound (A), and wherein the compound (A) and the resin stabilizer (B) are present in the melt-blend in an amount to provide a mass ratio (A)/(B) of 95/5 to 50/50 sufficient to reduce the melt temperature of the ultraviolet light absorber composition; and thereafter
(2) blending a synthetic resin with a UV light-absorbing sufficient amount of the ultraviolet light absorber composition to form a UV light stabilized synthetic resin composition.

14. The method of claim 13, wherein the resin stabilizer (B) is the ultraviolet absorber (b-4) other than the compound (A).

15. The method of claim 13, wherein the benzotriazole ultraviolet absorber is a compound represented by formula (II):

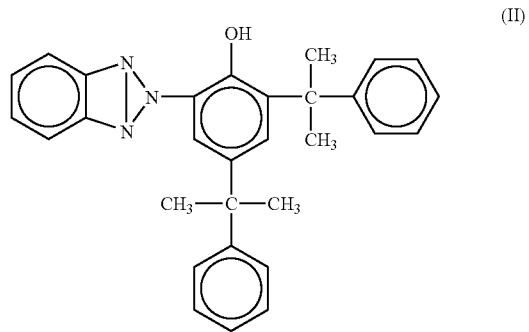

16. The method of claim 13, wherein the synthetic resin is a polyolefin resin.

* * * * *